(12) United States Patent
Hatano

(10) Patent No.: US 6,956,679 B2
(45) Date of Patent: Oct. 18, 2005

(54) PAPER FEEDER APPARATUS AND FACSIMILE APPARATUS

(75) Inventor: Yasuhiro Hatano, Ebina (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 824 days.

(21) Appl. No.: 09/919,956

(22) Filed: Aug. 2, 2001

(65) Prior Publication Data
US 2002/0041402 A1    Apr. 11, 2002

(30) Foreign Application Priority Data
Sep. 29, 2000    (JP) ............... 2000-299769

(51) Int. Cl.[7] .............................. H04N 1/04
(52) U.S. Cl. ............ 358/474; 358/498; 358/497; 358/496; 271/109; 271/126; 271/227
(58) Field of Search ............... 358/474, 498, 358/497, 496, 400; 271/109, 126, 227

(56) References Cited

U.S. PATENT DOCUMENTS

| | | | |
|---|---|---|---|
| 2,484,269 A * | 10/1949 | Carlson ............... | 2/174 |
| 3,790,159 A * | 2/1974 | Hatzmann et al. ......... | 271/4.03 |
| 5,528,352 A * | 6/1996 | Ichinokawa et al. ........ | 399/365 |
| 5,533,721 A * | 7/1996 | Takashimizu ............... | 271/109 |
| 5,671,466 A * | 9/1997 | Hokamura et al. ......... | 399/124 |
| 6,104,508 A * | 8/2000 | Miyazaki .................... | 358/474 |
| 6,307,621 B1 * | 10/2001 | Endo et al. ................. | 355/407 |
| 6,392,763 B1 * | 5/2002 | Nishinohara et al. ....... | 358/496 |
| 6,433,897 B1 * | 8/2002 | Wilcox et al. ............. | 358/498 |
| 6,598,873 B2 * | 7/2003 | Takisawa et al. .......... | 271/246 |

* cited by examiner

Primary Examiner—Kimberly Williams
Assistant Examiner—Negussie Worku
(74) Attorney, Agent, or Firm—Greenblum & Bernstein, P.L.C.

(57) ABSTRACT

A paper feeding apparatus is provided with a pressing arm that presses the separator to a paper feed roller, a document guide that has a pair of guide parts for pressing a document to the paper feed roller, and a spring part that applies spring force to the pressing arm and the document guide. The guide parts are located at both edges of the separator. The document guide guides the document so that the front edge of the document passes over the paper feed roller, and presses the document to the paper feed roller.

5 Claims, 5 Drawing Sheets small moderate large

PAPER FEEDER APPARATUS AND FACSIMILE APPARATUS

BACKGROUND OF THE INVENTION

1. Field of the Invention

The present invention relates to a paper feeder apparatus and a facsimile apparatus or similar printing apparatus having the paper feeder apparatus.

2. Description of the Related Art

Conventionally, as shown in FIG. 5, a paper feeder used in a facsimile apparatus comprises a lower document guide 1 for setting documents, which is concurrently a paper holder, an upper document guide 2 positioned above the lower document guide 1, a paper feed roller 3, and a separator 4 for preventing double feeding of documents cooperates with the paper feed roller 3. A pressing part 5 is mounted to the upper document guide 2 at the support point O and presses the separator 4 towards the paper feed roller 3, and a spring member 6 such as a compression spring presses the edge of the pressing part so that the pressing part 5 presses the separator 4. A document guide panel 7 that includes a pair of leaf springs at both edges of the separator 4 for guiding the front edge of a document to the paper feed roller 3 and for pressing the document to the paper feed roller 3 is also provided.

When documents are set in the documents holder, the documents guide panel 7 pushes the documents gently towards the paper feed roller 3. Then the paper feed roller 3 rotates to send the document between the paper feed roller 3 and the separator 4, preventing double feeding of documents by the paper feed roller 3 and the separator 4. Thus, the document is transferred to a scanner section positioned downstream of the paper feeder.

In the conventional paper feeder, a pair of leaf springs is used as document guide panel 7 for guiding the front edge of a document and for pressing the document to the paper feed roller gently. However, pressing power applied to a document by the pair of leaf springs is designed to be very small (for example, about 10 to 20g). As a result, the leaf springs are small and easily deformable, hence great attention is necessary for handling and installing them. Further, because the conventional document guide 7 uses the spring power of the leaf springs for pressing a document to the paper feed roller, high accuracy production (accuracy in size and spring constant) is necessary to avoid irregularity or variation of the pressing power. As a result, significant manufacturing and assembly costs cannot be avoided.

SUMMARY OF THE INVENTION

Accordingly, it is an objective of the present invention to provide a paper feeder apparatus at low cost, using a part without spring operation, instead of a pair of leaf springs, for guiding the front edge of the document and for pressing the document to a paper feed roller.

Another objective of the present invention is to provide a paper feeder apparatus that can reduce the number of parts and make parts production easy.

The present invention provides a paper feeder apparatus including a paper feed roller that feeds a document, a separator that prevents double feeding of documents by said paper feed roller, and a pressing arm that presses the separator to the paper feed roller. A document guide is provided with a pair of guide parts, the guide parts being located at both edges of the separator, the guide parts guiding the document so that a front edge of the document passes over the paper feed roller, and the guide parts pressing the document to the paper feed roller. A spring part provides a spring force to the pressing arm and to the document guide so that the pressing arm presses the separator and the document guide presses the document towards the paper feed roller.

In this configuration, two leaf springs used conventionally are not necessary and instead, only the document guide of one piece constructions without a spring is used.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

This invention will be described in further detail by way of example with reference to the accompanying drawings.

Figure 1:
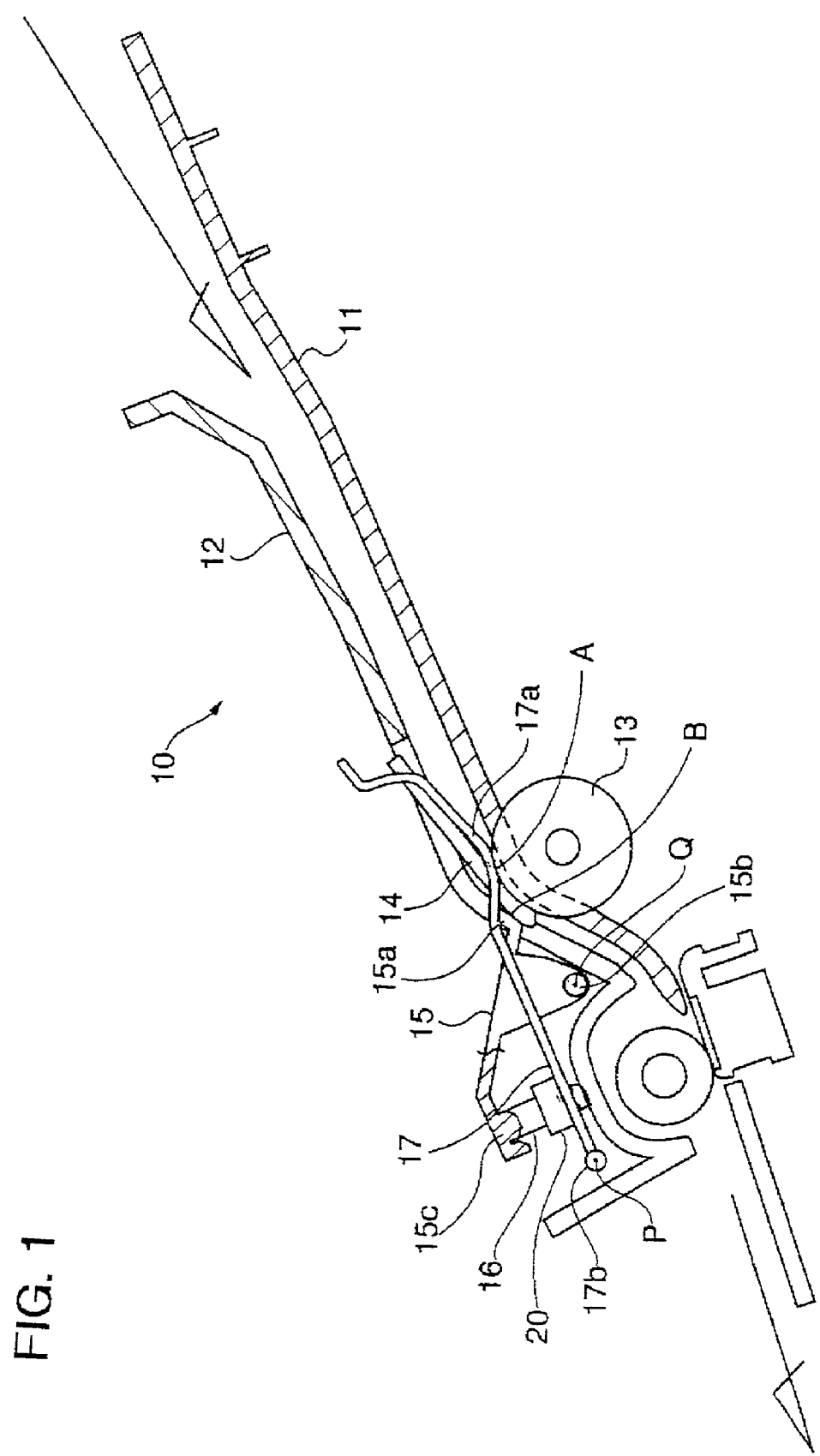
FIG. 1 illustrates a schematic cross-sectional view of a paper feeder according to an embodiment of the present invention.
Figure 2:
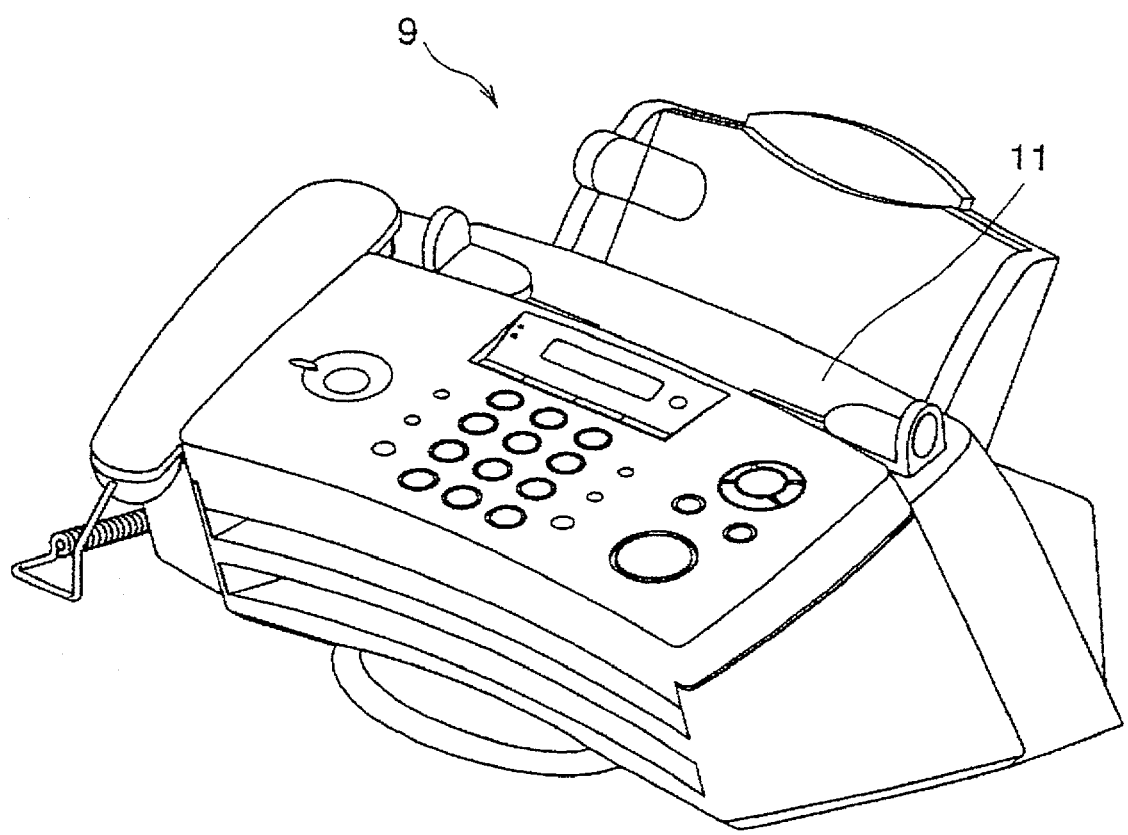
FIG. 2 illustrates a schematic perspective view of a facsimile apparatus comprising a paper feeder shown in FIG. 1.
Figure 3:
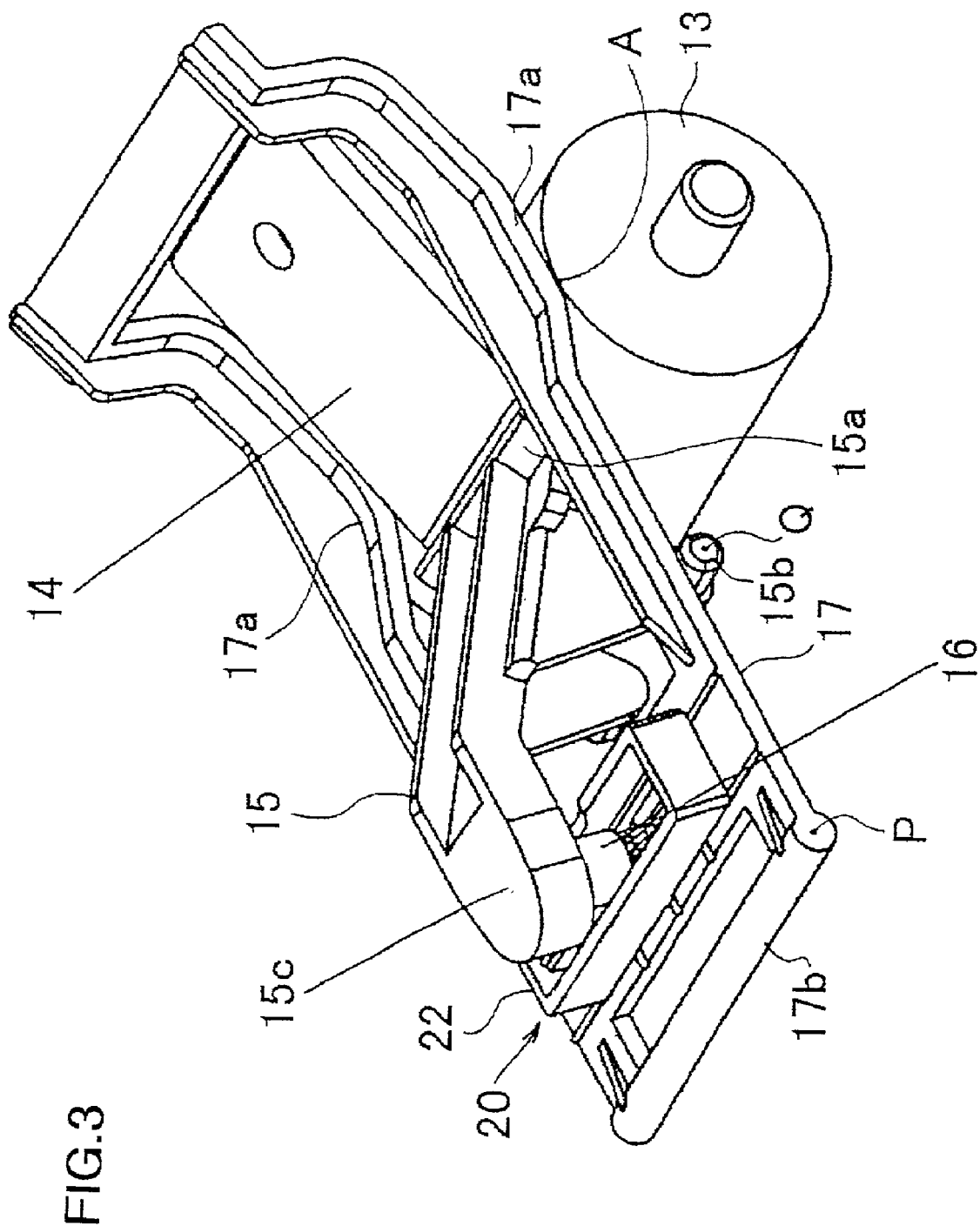
FIG. 3 illustrates a schematic perspective view of the main part of the paper feeder shown in FIG. 1.

FIG. 1 is a schematic cross-sectional view of the paper feeder of the embodiment of the present invention. FIG. 2 is a schematic perspective view of the facsimile apparatus that is provided with the paper feeder. FIG. 3 shows a schematic perspective view of the main portion of the paper feeder shown in FIG. 1. FIGS. 4(*a*), 4(*b*), and 4(*c*) show schematic cross-sectional views for describing the spring force control operation by means of spring force control that the paper feeder uses.

The facsimile apparatus, indicated by reference number 9 as a whole in FIG. 2, has a document holder 11 at the rear portion of the apparatus and a paper feeder 10 shown in FIG. 1 at the lower portion of the apparatus.

In FIG. 1 and FIG. 3, the paper feeder 10 comprises a lower document guide 11 that is concurrently a document holder, an upper document guide 12 installed above the lower document guide 11, a paper feed roller 13, and a separator 14 that advances or forwards a document while preventing double feeding in cooperation with the paper feed roller. A pressing arm 15 has a pressing portion 15*a* to press the separator to the paper roller 13 and a spring part 16 supplies spring force to the pressing arm 15 so that the pressing arm 15 presses the separator 14. A document guide 17 is located at both sides of the separator 14, and guides the document so that the front edge of the document passes over the paper feed roller 13. A pair of guide parts 17*a* press the document to the paper feed roller 13.

In contrast to the conventional two leaf springs structure, the document guide 17 is made of resin, formed unitarily and of one piece construction, and is equipped with a support axis 17b at the edge spaced from the guide parts 17a that guide a document and press the document to the feed roller 13. The support axis 17b is positioned at the first support point P spaced from the first pressing point A at which the guide parts 17a press the document to the paper feed roller 13. The document guide 17 is installed at the upper document guide 12 so that it can rotate freely.

Figure 5:
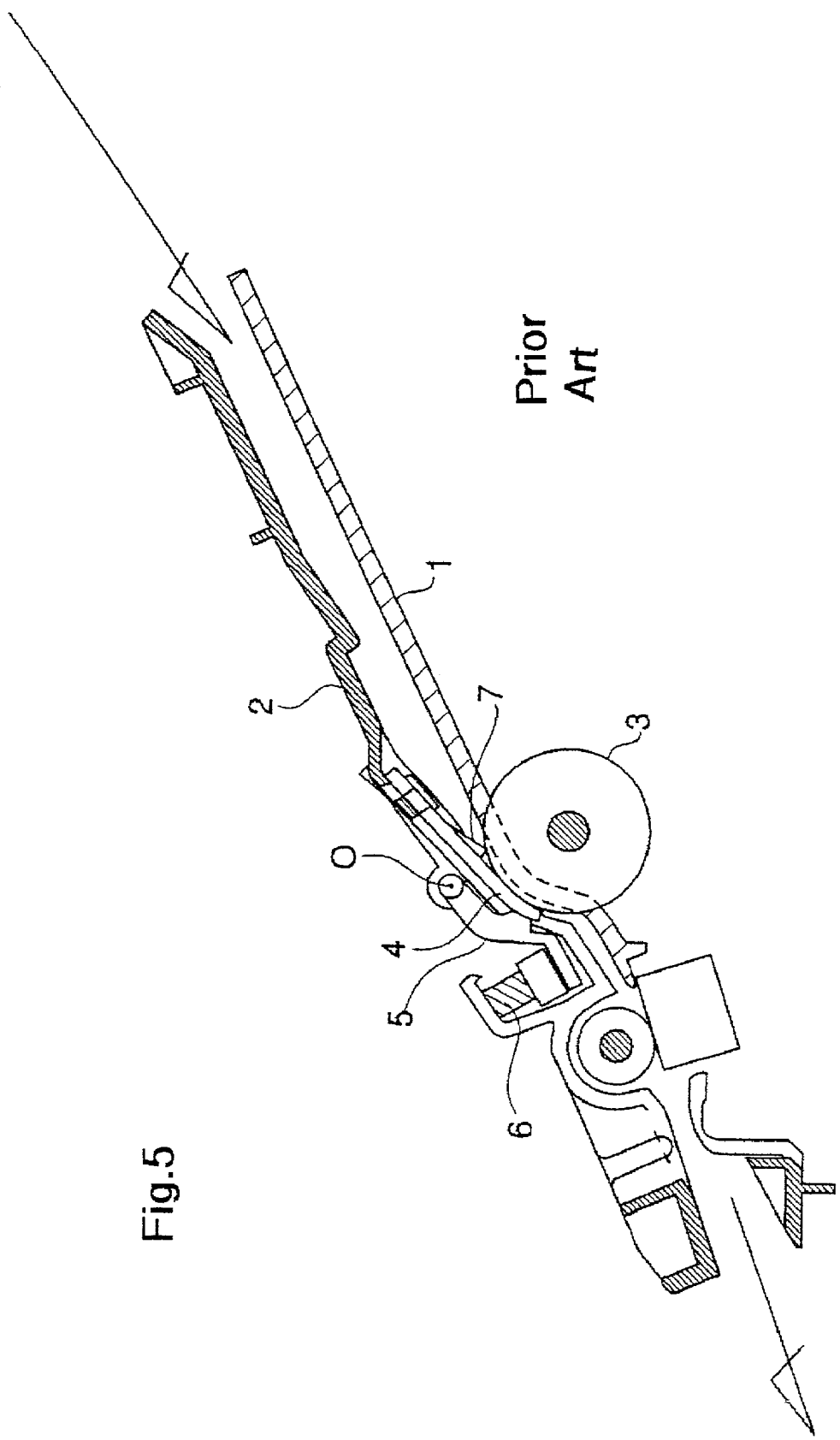
FIG. 5 illustrates a schematic cross sectional view of a conventional paper feeder.

In this configuration, the document guide 17 can move about the first support point P. Pressed downward by the spring part 16, the pair of guide parts 17a can be pressed to the paper feed roller 13. Thus it is possible to perform the same function as that of conventional document guide panel 7 (FIG. 5) that uses a pair of leaf springs. Production of the document guide 17, that is made of resin in one piece is easier in comparison with that which requires leaf springs; hence it is possible to realize cost savings.

The pressing arm 15 has a support axis 15b spaced from the pressing portion 15a and the support axis 15b is at the second support point Q located between the second pressing point B, at which the press member 15 presses the separator 14, and the first support point P. The pressing arm 15 is installed at the upper document guide 12 so that it can rotate freely.

Thus, the pressing arm 15 can pivot at the second support point Q. Further, the pressing arm 15 stretches upward through the large opening of the document guide 17, and in the opposite direction to the other side of the support axis 15b. The pressing arm 15 has a spring connection section 15c facing the document guide 17 at the end thereof.

A spring force controlling section 20 for controlling a spring force of a spring part 16 is located at the position of the document guide 17 facing towards the spring connection section 15c of the pressing arm 15. As shown in FIG. 4, the spring force controlling section 20 includes a spring support 22 moveably provided within the groove 21 formed in the document guide 17. The spring support 22 has three spring support faces 22a, 22b and 22c which are of different heights. The spring part 16 is set on one of the spring support faces 22a, 22b and 22c at the bottom end and is connected to the spring connection section 15c of the pressing arm 15 at the upper end. Thus, the spring part 16 pushes down the document guide 17 at the bottom end so that the pair of guide parts 17a of the document guide 17 presses against the paper feed roller 13. At the same time, the spring part 16 pushes up the pressing arm 15 at the top, therefore, the pressing portion 15a of the pressing arm 15 can press the separator 14.

Figure 4A:
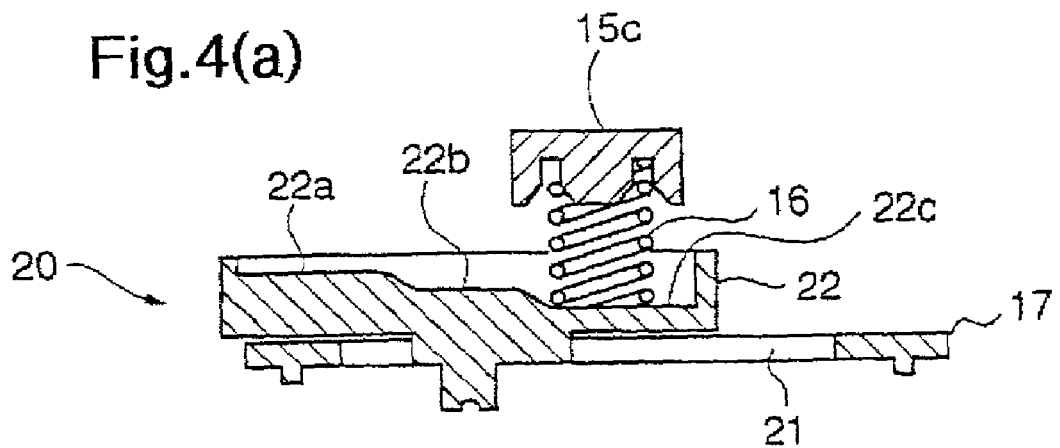
FIGS. 4(*a*), 4(*b*), and 4(*c*) illustrate in schematic cross sectional views, spring force control operation by means of spring force control used in the paper feeder according to the present invention.
Figure 4B:
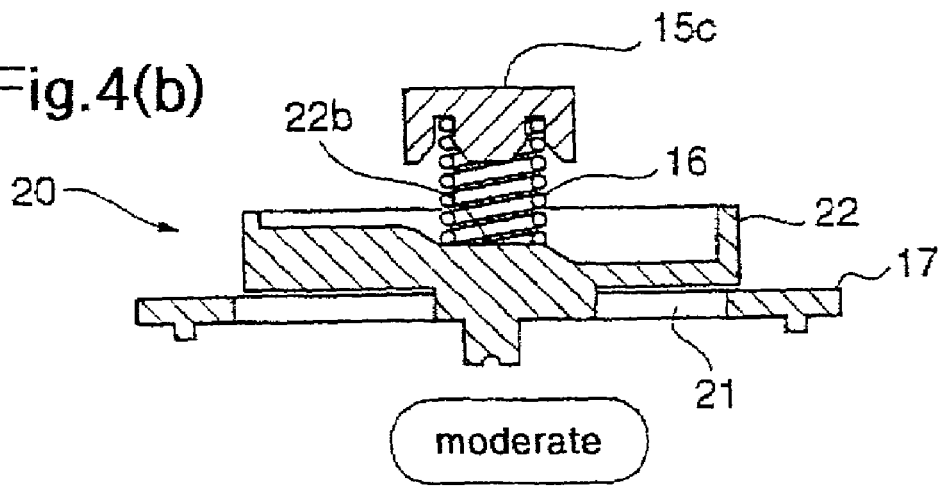
Figure 4C:
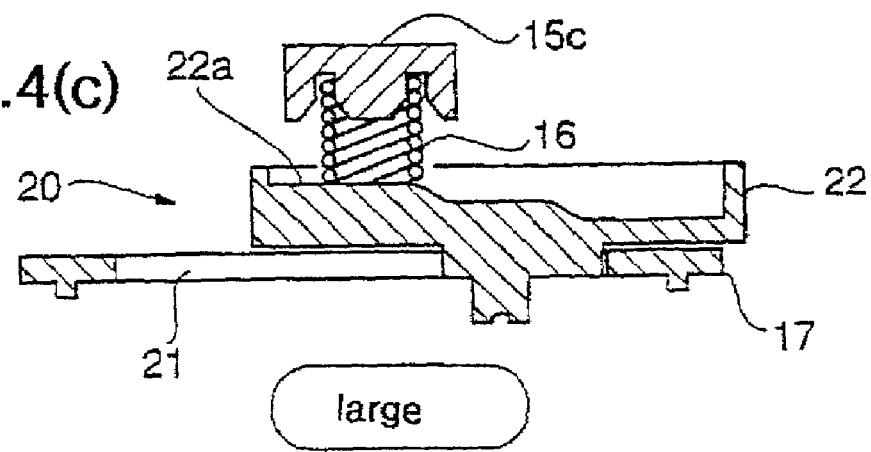

As shown in FIGS. 4(a), 4(b) and 4(c), the spring support faces 22a, 22b, and 22c that support the bottom of the spring part 16 can be switched by moving the spring support 22. Thus, the spring force of the spring part 16 can be changed, as a result, the pressure force exerted by the pressing portion 15 and the document guide 17 can be controlled.

In FIG. 1 and FIG. 3, it is necessary to set the pressure force with which the document guide 17 presses the document to the paper feed roller 13 (the pressure force at the first pressing point A) to be small, and to set the pressure force of the pressing arm 15 that presses the separator 14 to the paper feed roller 13 (the pressure force at the second pressing point) to be large. In order to accomplish this with the common spring part 16, the spring force of the spring part 16 needs to provide the pressure force required by the pressing portion 15. In addition, the position, at which the spring part 16 presses the document guide 17, is located near the first support point P.

In this configuration, the distance from the first support point P to the spring part 16 can be quite smaller than that from the first support point P to the first pressing point A; hence the pressure force applied to the document at the document guide 17 can be very small. By setting the ratio of these distances appropriately, the pressure force applied to documents on the document guide 17 can be made to have a small value.

In the above-mentioned paper feeder apparatus, when plural pages of documents are put on the document holder 11, the front edge of the document is guided by the pair of guide parts 17a of the document guide 17. The document passes between the paper feed roller 13 and the guide parts 17a, and is inserted to the contact section of the paper feed roller 13 and the separator 14. The pair of guide parts 17a of the document guide 17 gently press the document to the paper feed roller 13 slightly upstream of the contact point of the paper feed roller 13 and the separator 14. When the paper feed roller 13 rotates in this situation, the document, gently pressed to the paper feed roller 13, is inserted between the paper feed roller 13 and the separator 14 by the paper feed roller 13. The document is thus transferred downstream, preventing double feeding by the paper feed roller 13 and the separator 14. Thus, it is possible to ensure that documents are separated and are fed in a page-by-page fashion.

As mentioned above, the paper feeder apparatus of the present invention comprises the document guide 17 of one piece structure that has the pair of guide parts 17a located at both sides of a separator. By applying the spring force of the spring part 16 to the document guide 17, the pair of guide parts 17a presses the document to the paper feed roller 13. This makes it possible to feed documents by guiding the front edge of the document and pressing the document to the paper feed It is noted that the foregoing has been provided merely for the purpose of explanation and is in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

This application is based on the Japanese Patent Application No. 2000-299769 filed on Sep. 29, 2000, entire content of which is expressly incorporated by reference herein.

What is claimed is:

1. A paper feeder apparatus, comprising:
   a paper feed roller that feeds a document:
   a separator that prevents a plurality of documents from being fed by the paper feed roller;
   a document guide that includes a pair of guide portions, the pair of guide portions being located at both sides of the separator, the document guide being movably mounted at a first support point, the first support point being spaced from a first pressing point, the pair of guide portions being pressed toward the paper feed roller at the first pressing point;

a pressing arm that presses the separator toward the paper feed roller after the pair of guide portions is pressed toward the paper feed roller, the pressing arm being movably mounted at a second support point, the second support point being located between the first support point and a second pressing point, the separator being pressed toward the feed roller at the second pressing point;

a spring that provides spring force to the separator and to the document guide, the spring providing the spring force to the document guide at a predetermined position between the first support point and the first pressing point of the document guide in one direction, the spring providing the spring force in a direction opposite to the first direction.

2. The paper feeder apparatus according to claim 1, wherein the second support point of the pressing arm is located between a position of the pressing arm pressed by the spring and the second pressing point of the pressing arm.

3. The paper feeder apparatus according to claim 1, wherein the predetermined position is located near the first support point.

4. The paper feeder apparatus according to claim 1 further comprising a spring force controlling section configured to control the spring force of the spring.

5. A facsimile apparatus equipped with the paper feeder apparatus according to claim 1.

* * * * *